(12) United States Patent
Gupta et al.

(10) Patent No.: US 12,701,088 B2
(45) Date of Patent: Aug. 4, 2026

(54) CROSSBAR WITH DYNAMIC SELECTION

(71) Applicant: NVIDIA Corporation, Santa Clara, CA (US)

(72) Inventors: Karan Gupta, Bangalore (IN); Dane Thomas Mrazek, Redwood City, CA (US); Nan Jiang, Sudbury, MA (US); Mukesh Chand Agarwal, Bangalore (IN)

(73) Assignee: NVIDIA Corporation, Santa Clara, CA (US)

( * ) Notice: Subject to any disclaimer, the term of this patent is extended or adjusted under 35 U.S.C. 154(b) by 527 days.

(21) Appl. No.: 18/137,132

(22) Filed: Apr. 20, 2023

(65) Prior Publication Data

US 2024/0356866 A1    Oct. 24, 2024

(51) Int. Cl.
| *H04L 49/00* | (2022.01) |
| *H04L 49/101* | (2022.01) |
| *H04L 49/9047* | (2022.01) |

(52) U.S. Cl.
CPC ........ *H04L 49/101* (2013.01); *H04L 49/3018* (2013.01); *H04L 49/3027* (2013.01); *H04L 49/9047* (2013.01)

(58) Field of Classification Search
CPC ............... H04L 49/101; H04L 49/3018; H04L 49/3027; H04L 49/9047
USPC ........................................ 370/329
See application file for complete search history.

(56) References Cited

U.S. PATENT DOCUMENTS

| | | | | |
|---|---|---|---|---|
| 6,813,274 B1 * | 11/2004 | Suzuki | H04L 49/101 | 370/386 |
| 7,522,527 B2 * | 4/2009 | Jun | H04L 49/45 | 370/414 |
| 10,911,038 B1 * | 2/2021 | Stark | H04L 45/748 | |
| 2004/0225734 A1 * | 11/2004 | Schober | H04L 47/50 | 709/225 |
| 2005/0021797 A1 * | 1/2005 | Talaat | H04L 49/35 | 709/230 |
| 2015/0003247 A1 * | 1/2015 | Mejia | H04L 45/18 | 370/235 |
| 2017/0180243 A1 * | 6/2017 | Haramaty | H04L 45/18 | |
| 2017/0339071 A1 * | 11/2017 | Cheng | H04L 47/30 | |
| 2020/0236052 A1 * | 7/2020 | Srinivasan | H04L 45/28 | |
| 2021/0258252 A1 * | 8/2021 | Olson | H04L 47/29 | |
| 2021/0409348 A1 * | 12/2021 | Liu | H04L 49/25 | |
| 2022/0191127 A1 * | 6/2022 | Kopser | H04L 47/2441 | |
| 2022/0263775 A1 * | 8/2022 | Jung | H04L 47/39 | |
| 2022/0417155 A1 * | 12/2022 | Muntz | H04L 47/125 | |
| 2022/0417163 A1 * | 12/2022 | Muntz | H04L 12/44 | |
| 2023/0289190 A1 * | 9/2023 | Parle | G06F 9/3887 | |
| 2024/0056385 A1 * | 2/2024 | Bataineh | H04L 47/76 | |

* cited by examiner

*Primary Examiner* — Robert J Lopata
(74) *Attorney, Agent, or Firm* — Sheridan Ross P.C.

(57) ABSTRACT

A Dynamic Destination Selection (DDS) crossbar, system for routing a packet, and a switch are provided. An illustrative DDS crossbar includes one or more adaptive routing circuits to track destination credit and port availability at a time of dispatching a packet, group multiple destinations into super destination groups, perform dynamic destination routing within a super destination group, and use the destination credit and port availability for the super destination group at the time of receiving the packet to select an output destination for the packet.

18 Claims, 4 Drawing Sheets

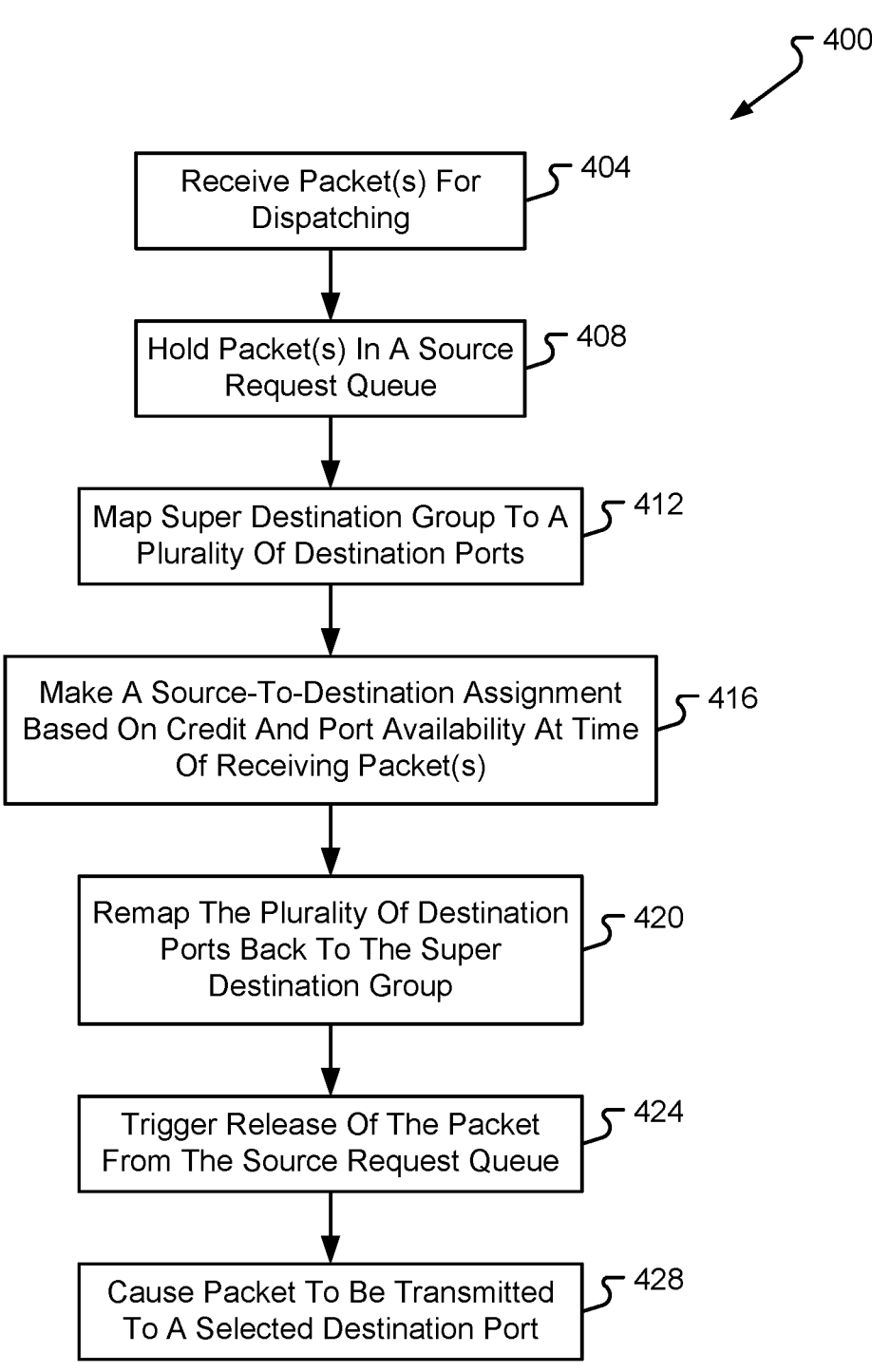

400

Receive Packet(s) For Dispatching — 404

Hold Packet(s) In A Source Request Queue — 408

Map Super Destination Group To A Plurality Of Destination Ports — 412

Make A Source-To-Destination Assignment Based On Credit And Port Availability At Time Of Receiving Packet(s) — 416

Remap The Plurality Of Destination Ports Back To The Super Destination Group — 420

Trigger Release Of The Packet From The Source Request Queue — 424

Cause Packet To Be Transmitted To A Selected Destination Port — 428

*Fig. 4*

CROSSBAR WITH DYNAMIC SELECTION

FIELD OF TECHNOLOGY

The present disclosure relates to crossbar switches, and more particularly, to techniques for achieving high bandwidth capacity switching.

BACKGROUND

A crossbar switch may implement permutations of connections among source ports and destination ports. Techniques for achieving increases in data speed of a crossbar switch are desired.

SUMMARY

In some memory subsystems, the crossbar has the routing flexibility to send (certain) packets on any port within a subset of destination ports, and the packet will reach the final client where the packet can be reassembled. Embodiments of the present disclosure aim to provide a Dynamic Destination Selection (DDS)-based crossbar that can leverage the above-noted routing flexibility.

Specifically, embodiments of the present disclosure contemplate the ability to provide a DDS crossbar design that can be extended to any crossbar configuration or architecture. In some embodiments, a DDS crossbar as described herein may be helpful to improve arbiter efficiency in non-ideal workload scenarios where one destination is stalled more as compared to other destination(s). A DDS crossbar as described herein may also be helpful in scenarios where sources are transmitting more toward one destination port as compared to other destination ports. Ideal workloads where all destinations experience equal loading may also benefit from improved arbiter efficiencies by implementing a DDS crossbar as described herein.

Prior pre-dispatch adaptive routing designs use port credit availability, load, Round-Trip Time (RTT), or other port-level metrics to dynamically select a destination. The DDS crossbar depicted and described herein provides a DDS-based at-dispatch adaptive routing technique that is tightly integrated with the crossbar dispatcher. In some embodiments, the DDS crossbar may utilize instantaneous destination availability at the arbitration time to select an output destination. The selection of the destination can change from cycle to cycle depending on the network state, whereas in prior solutions the destination selection does not change in the crossbar dispatcher. Integrating adaptive routing with the crossbar dispatcher allows for more adaptation to transient crossbar contention, much better suited for the small packet environment of a Graphics Processing Unit (GPU) crossbar, for example.

A Dynamic Destination Selection (DDS) crossbar is provided that includes: one or more adaptive routing circuits that are configured to track destination credit and port availability at a time of dispatching a packet, group multiple destinations into super destination groups, perform dynamic destination routing within a super destination group, and use the destination credit and port availability for the super destination group at the time of receiving the packet to select an output destination for the packet.

In some embodiments, the one or more adaptive routing circuits include one or more source request queues that are maintained on a super destination group basis.

In some embodiments, the one or more adaptive routing circuits further include a mapper block connected to an output of a respective source request queue from the one or more source request queues, where the mapper block maps a super destination group to multiple destination ports, based on the destination credit availability at the time of receiving the packet.

In some embodiments, the one or more adaptive routing circuits further include one or more arbiter blocks connected to an output of the mapper block, where the one or more arbiter blocks are configured to make source-to-destination assignments for the packet.

In some embodiments, the one or more arbiter blocks make the source-to-destination assignment for the packet based on the destination port availability at the time of receiving the packet.

In some embodiments, the one or more adaptive routing circuits further include a remapper block connected to an output of the one or more arbiter blocks, where the remapper block maps the multiple destination ports back to the super destination group. Alternatively or additionally, the remapper block may trigger the packet to be removed from the corresponding source request queue upon processing the packet.

In some embodiments, the packet includes a static destination routable packet, which can be routed to specific destination only.

In some embodiments, the packet includes a dynamic destination routable packet, which can be routed to any one of the destinations in a super destination group.

In some embodiments, the DDS crossbar further includes one or more per-source ingress data buffers. The per-source ingress data buffer may be virtually-output queued based on destination.

In some embodiments, the one or more adaptive routing circuits include a two-dimensional arbiter that supports routing of static destination routable packets and dynamic destination routable packets.

In some embodiments, the one or more adaptive routing circuits are configured to redetermine the destination credit and port availability on a per cycle basis (e.g., every clock cycle, every predetermined period of time, every second, etc.).

Another aspect of the present disclosure is to provide a system for routing a packet, where the system includes: one or more source request queues that are maintained on a super destination group basis and that are to receive the packet; a mapper block connected to an output of a respective source request queue from the one or more source request queues, where the mapper block maps a super destination group to multiple destination ports; one or more arbiter blocks that make source-to-destination assignments for the packet; and a remapper block connected to an output of the one or more arbiter blocks, where the remapper block maps the multiple destination ports back to the super destination group.

In some embodiments, the mapper block is one of a plurality of mapper blocks and each of the plurality of mapper blocks map different super destination groups to a respective subsets of destination ports.

In some embodiments, the remapper block is one of a plurality of remapper blocks and each of the plurality of remapper block map the respective subset of destination ports back to the different super destination groups.

In some embodiments, the one or more arbiter blocks reside between the plurality of mapper blocks and the plurality of remapper blocks.

In some embodiments, a number of source request queues in the one or more source request queues map to different super destinations groups.

Another aspect of the present disclosure is to provide a switch that includes: a crossbar having one or more adaptive routing circuits that are configured to: hold a packet in source request queue that is maintained on a super destination group basis; map the super destination group to a plurality of destination ports; make a source-to-destination assignment for the packet based on destination credit and port availability at a time of receiving the packet; remap the plurality of destination ports back to the super destination group; and trigger release of the packet from the source request queue while also causing the packet to be transmitted to a selected destination port.

In some embodiments, the one or more adaptive routing circuits are configured to redetermine the destination credit and port availability on a per cycle basis, and the one or more adaptive routing circuits comprise a two-dimensional arbiter that supports routing of static destination routable packets and dynamic destination routable packets.

Examples may include one of the above-noted features, or any combination thereof.

BRIEF DESCRIPTION OF THE DRAWINGS

FIG. 4 illustrates an example process flow in accordance with aspects of the present disclosure.

DETAILED DESCRIPTION

The ensuing description provides example aspects of the present disclosure, and is not intended to limit the scope, applicability, or configuration of the claims. Rather, the ensuing description will provide those skilled in the art with an enabling description for implementing the described examples. It being understood that various changes may be made in the function and arrangement of elements without departing from the spirit and scope of the appended claims. Various aspects of the present disclosure will be described herein with reference to drawings that are schematic illustrations of idealized configurations.

Crossbar switches are designed to implement permutations of connections among source and destination ports. The terms "crossbar switch," "crossbar," and "crossbar circuit" may be used interchangeably herein. The terms "crossbar cell," "sub-crossbar cell," "sub-crossbar," and "sub-crossbar circuit" may be used interchangeably herein.

Aspects of the disclosure are further illustrated by and described with reference to apparatus diagrams, system diagrams, and flowcharts that relate to achieving high bandwidth capacity switching in a while mitigating increases in crossbar cell count.

Figure 1:
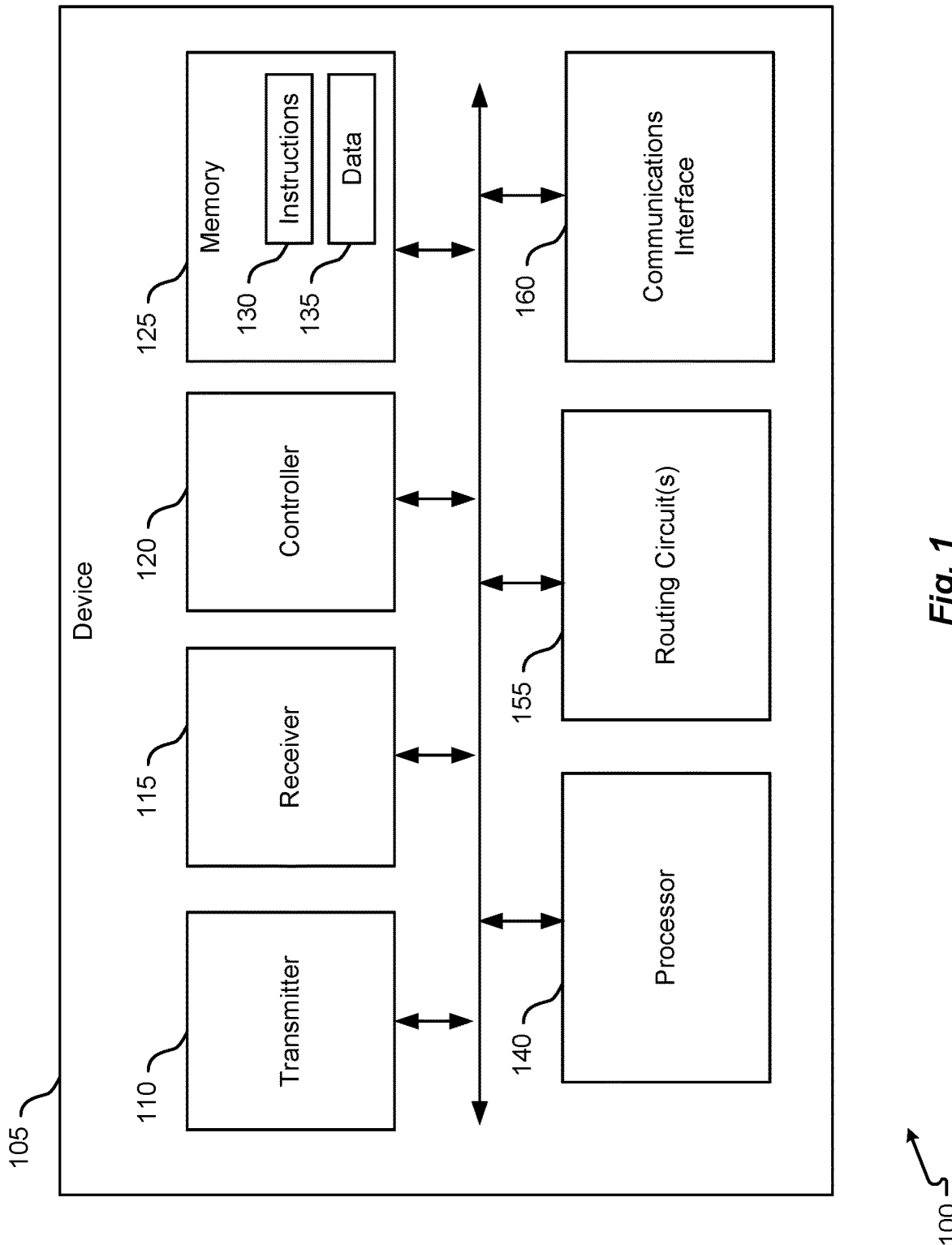
FIG. 1 illustrates an example of a system in accordance with aspects of the present disclosure.
Figure 2:
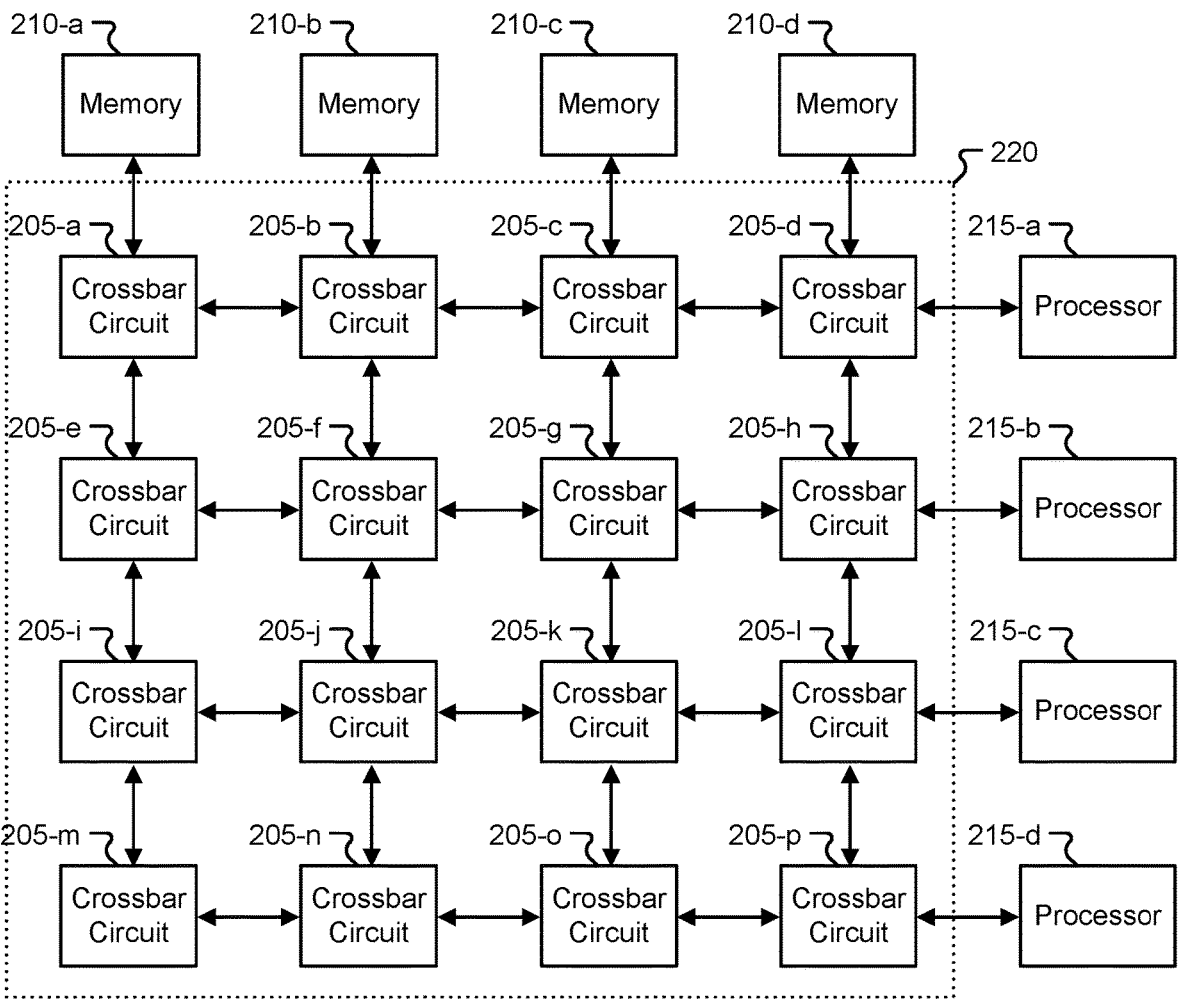
FIG. 2 illustrates an example of a crossbar circuit in accordance with aspects of the present disclosure.
Figure 2:
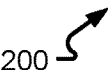

FIGS. 1 and 2 illustrate an examples of a system 100, 200 in accordance with aspects of the present disclosure. An illustrative system 100, 200 may include one or more routing circuits 155. In some embodiments, the one or more routing circuits 155 may correspond to or be provided as part of or more crossbar circuits 205a-p. Routing of packets by the device 105 may be implemented using the various components of the device 105. Illustratively, and without limitation, the device 105 may include a transmitter 110, a receiver 115, a controller 120, memory 125, a processor 140, the one or more routing circuits 155, and a communications interface 160.

The communications interface 160 may include one or multiple communication ports, which may be treated as source ports and/or destination ports. Packets received at the communication interface 160 may be processed by a receiver 115, then may be processed by the controller 120 and/or processor 140 that utilizes instructions 130 and/or data 135 to make routing decisions for the packet. When a routing decision is made for a packet, then the packet (or portions thereof) may passed to a transmitter 110 which causes the packet (or portions thereof) to be transmitted to a destination address via the communications interface 160. As will be described in further detail herein, the routing circuit(s) 155 may be responsible for efficiently transferring a packet from a packet source to a packet destination.

In some examples, the memory device 125 may be or include any electronic component capable of storing electronic information. The memory device 125 may include one or multiple different types of computer memory devices. Likewise, the processor 140 may include one or multiple different types of processing devices. Non-limiting examples of processing devices that may be provided as part of the processor 140 include a GPU, a Central Processing Unit (CPU), an Integrated Circuit (IC) chip, a microprocessor, a multi-cored processor, a Data Processing Unit (DPU), or the like.

As will be described in further detail herein, the routing circuit(s) 155 may be included in one or more crossbar circuits 205a-p, and may form a communication network 220 (also referred to herein as a network fabric) for communicating packets or data between the memory device(s) 125 and/or processor(s) 140. Each of the crossbar circuits 205a-p may include control logic for setting up transfer paths for communicating packets or data between a memory 125 and a processor 140.

In some examples, components of the device 105 (e.g., transmitter 110, receiver 115, controller 120, memory 125, processor 140, routing circuit(s) 155, communications interface 160, etc.) may communicate over a system bus (e.g., control busses, address busses, data busses, etc.) included in the device 105.

The transmitter 110 and the receiver 115 may support the transmission and reception of signals to and from the device 105. In some aspects, the transmitter 110 and the receiver 115 may support the transmission and reception of signals within the device 105. The transmitter 110 and receiver 115 may be collectively referred to as a transceiver. An antenna may be electrically coupled to the transceiver. The device 105 may also include (not shown) multiple transmitters 110, multiple receivers 115, multiple transceivers and/or multiple antennas.

The controller 120 may be located on a same chip (e.g., ASIC chip) as the transmitter 110 and/or the receiver 115. In some cases, the controller 120 may be located on a different chip as the transmitter 110 and/or the receiver 115. In some examples, the controller 120 may be located on a chip of or on a chip of another device 105. In some examples, the controller 120 may be a programmed microprocessor or microcontroller. In some aspects, the controller 120 may include one or more CPUs, memory, and programmable I/O peripherals. The controller 120 may control the routing circuit(s) 155 to route data according to the techniques described herein.

The memory 125 may be any electronic component capable of storing electronic information. The memory 125 may be, for example, random access memory (RAM), read-only memory (ROM), magnetic disk storage media, optical storage media, flash memory devices in RAM, on-board memory included with the processor, EPROM memory, EEPROM memory, registers, and so forth, including combinations thereof.

The memory 125 may include instructions 130 (computer readable code) and data 135 stored thereon. The instructions 130 may be executable by the processor 140 to implement the methods disclosed herein. In some aspects, execution of the instructions 130 may involve one or more portions of the data 135. In some examples, when the processor 140 executes the instructions 130, various portions of the instructions 130 and/or the data 135 may be loaded onto the processor 140.

The processor 140 may correspond to one or multiple computer processing devices. For example, the processor 140 may include a silicon chip, such as a Field Programmable Gate Array (FPGA), an ASIC, any other type of Integrated Circuit (IC) chip, a collection of IC chips, or the like. In some aspects, the processors may include a microprocessor, a Central Processing Unit (CPU), a Graphics Processing Unit (GPU), or plurality of microprocessors configured to execute instructions sets stored in a corresponding memory (e.g., memory 125 of the device 105). For example, upon executing the instruction sets stored in memory 125, the processor 140 may enable or perform one or more functions of the device 105. In some examples, a combination of processors 140 (e.g., an advanced reduced instruction set computer (RISC) machine (ARM) and a digital signal processor (DSP)) may be implemented in the device 105.

The communications interface 160 may support interactions (e.g., via a physical or virtual interface) between a user and the device 105. The communications interface 160 may include one or more communication ports and drivers thereof. Illustratively, the communications interface 160 may facilitate the machine-to-machine exchange of packets via wired and/or wireless communications.

Example aspects of the crossbar circuits 205, memory 125, and processors 140 will be described with reference now to FIG. 3.

Figure 3:
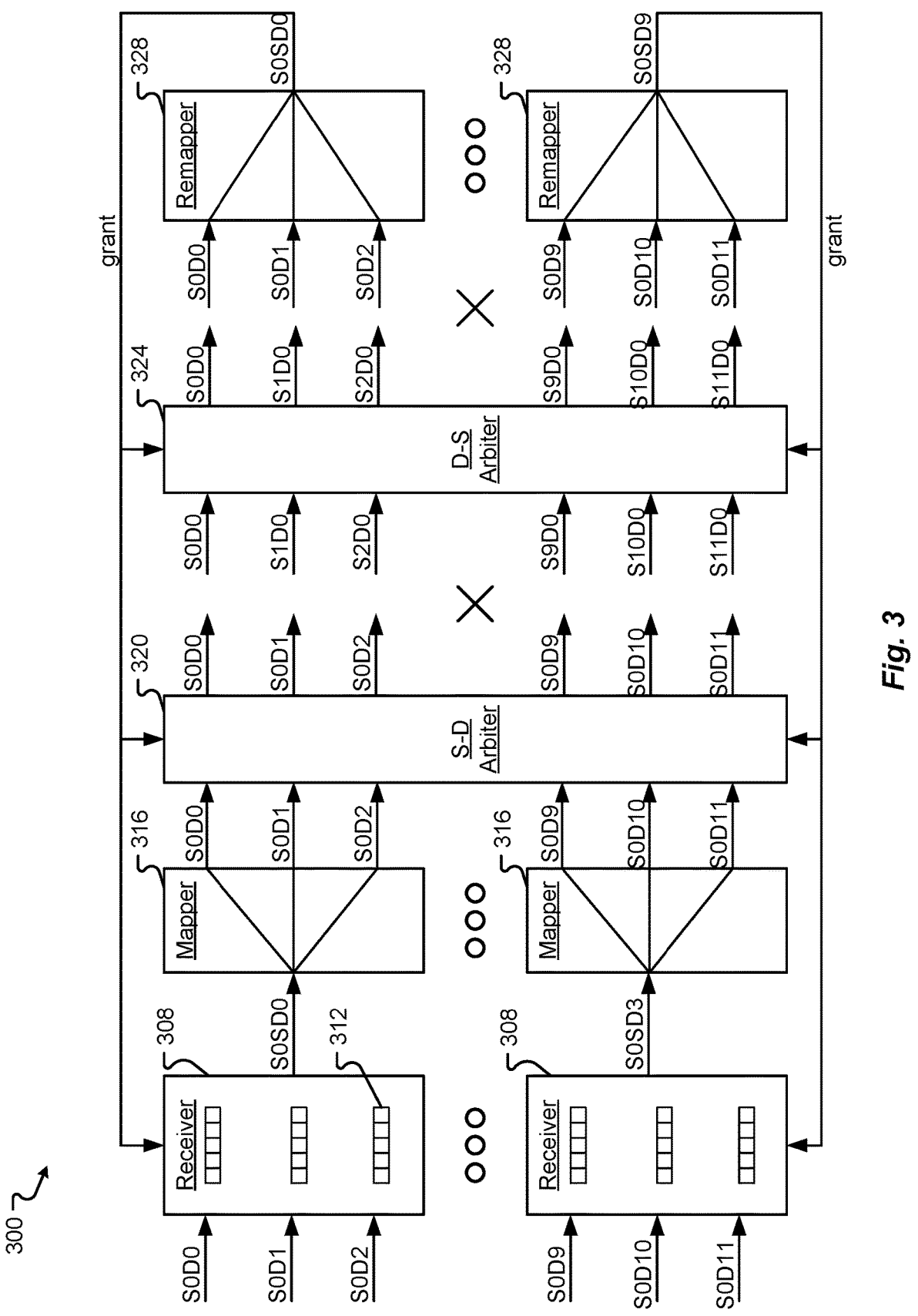
FIG. 3 illustrates additional details of a crossbar circuit in accordance with aspect of the present disclosure.

FIG. 3 illustrates an example of a system 300 supported by aspects of the present disclosure. The system 300 may be provided as a part of one or more crossbar circuits 205. In some embodiments, the system 300 may be or include the routing circuit(s) 155. As will be discussed in further detail herein, a crossbar circuits 205 including an architecture as depicted in the system 300 may be referred to as a DDS crossbar 300, DDS dispatcher 300, DDS crossbar dispatcher 300, or DDS crossbar circuit. Components of a DDS dispatcher 300 may correspond to a component of the routing circuit(s) 155.

The DDS crossbar dispatcher 300 may correspond to an implementation of the controller 120 executing instructions 130 that enable the controller 120 to process packets. As noted above, the DDS crossbar dispatcher 300 may correspond to one type of circuit that includes the routing circuit(s) 155. In other words, the system 300 shown in FIG. 3 may include a routing circuit 155.

In some aspects, components of the routing circuit(s) 155 and/or DDS crossbar 300 described herein may be electrically coupled to each other, memory devices (e.g., memory 125 described with reference to FIG. 1), and/or processors (e.g., processors 140 of FIG. 1) via a system bus.

In an example, the DDS crossbar 300 may include routing circuit(s) 155 that are configured to track destination credit and port availability at a time of dispatching a packet. The routing circuit(s) 155 may also be configured to group multiple destinations into super destination groups, perform dynamic destination routing within a super destination group, and use the destination credit and port availability for the super destination group at the time of receiving the packet to select an output destination for the packet. As will be discussed in further detail herein, the DDS crossbar 300 may be configured to make source-to-destination assignments for packets received at the device 105.

The DDS crossbar 300 may further include one or more receiver circuits 308. The receiver circuits 308 may include one or more source request queues 312. The source request queue(s) 312 may be maintained on a super destination group basis and may be configured to receive and temporarily store a packet (or data associated with a packet). In some embodiments, the source request queue(s) 312 may be provided as a per-source ingress data buffer. The per-source ingress data buffer may be virtually-output queued based on destination.

The DDS crossbar 300 may further include one or more mapper blocks 316. Each mapper block 316 may be connected to an output of the a respective source request queue from the source request queue(s) 312 maintained in the one or more receiver circuits 308. In some embodiments, the one or more mapper blocks 316 may map a super destination group to multiple destination ports, possibly based on the destination credit availability at the time of dispatching a packet (e.g., a packet to be routed). In other words, mapper blocks 316 may be provided on a per-source and per-super destination level. Source request queues may also be provided on a per-source and per-super-destination level.

The DDS crossbar 300 may also include one or more dispatcher blocks, which may also be referred to as arbiter blocks 320, 324. The arbiter blocks 320, 324 may include a source-to-destination arbiter 320 and a destination-to-source arbiter 324. In some embodiments, both arbiter blocks 320, 324 may correspond to two-dimensional arbiters. An arbiter block 320, 324 may be configured to look at source-to-destination arcs available in each cycle (e.g., a clock cycle), and then try to make as many source-to-destination connections (also referred to as a "grant") as possible, within that particular cycle. In some embodiments, the DDS crossbar 300 may attempt to maximize the number of source-to-destination arc options available to the arbiters 320, 324, which may improve arbiter efficiency. It should be noted that the arbiter blocks 320, 324 can be provided in any suitable order. For instance, it may be possible to provide the destination-to-source arbiter 324 in front of the source-to-destination arbiter 320, meaning that arbitration can be performed in any desired order. In other words, any type of known or yet to be developed two-dimensional allocator is valid and useful in the system 300. For example, a wavefront allocator would work with DDS presenting the plurality of options and the allocator determining the source-to-destination winners.

Each mapper block 316 is shown to include a 1:3 wire that splits inputs from a receiver 308 for the arbiter 320. It should be appreciated that the mapper blocks 316 may facilitate a greater or lesser number of mappings (e.g., 1:2, 1:4, 1:4, . . . , 1:10, etc.). Additionally, while FIG. 3 illustrates a 12×12 configuration having four (4) super destinations, and each super destination includes three destinations, a different configuration may be utilized without departing from the scope of the present disclosure. For example, a 16×16 configuration could be envisioned where four super destinations are utilized, each having four destinations. In some embodiments, dynamic destination routing applies to desti-
nations within a super destination group. The mapper block
316 may also be configured to map a super destination group
to multiple destination ports, based on the destination credit
availability at the time of receiving the packet.

Upon receiving a packet (e.g., a dynamic destination
routable packet), the DDS crossbar 300 may push the packet
into the receiver's 300 source request queue 312. As men-
tioned above, source request queues 312 may be maintained
at a source and super destination basis. Multiple destination
ports can be grouped into a super destination group and there
may be multiple super destination groups in a switch.

The source request queue(s) 312 may feed the source-
super destination request to a mapper block 316, which is
also implemented on a per-source and super destination
basis. The mapper block 316 may take a dynamic destination
routable packet, then generate multiple source-to-destina-
tion options, which are provided to the arbiter 320. The
source-to-destination options may be generated, at least in
part, based on the individual destination credit availability.
It should be appreciated that the mapper block 316 may be
configured to handle static destination routable packets or a
mix of static destination routable packets and dynamic
destination routable packets. Static destination routable
packets may be routed to a specific destination only whereas
dynamic destination routable packets may be routed to any
one of a number of destinations in a super destination group.

The DDS crossbar may then utilize the arbiter(s) 320, 324
to implement a two-dimensional arbitration that includes a
front fill stage having round-robin source-choose destination
(SCD) arbitration 320, followed by a least recently used
(LRU) based destination-choose-source arbitration (DCS)
324. The two-dimensional arbitration may also include an
optional backfill stage using a Wave Front Allocator (WFA).

Following the arbitration, a remapper block 328 may be
invoked. In some embodiments, the remapper block 328
maps multiple destination ports back to the super destination
group. In other words, the remapper block 328 may perform
an inverse operation as compared to the mapper block 316.
As a more specific, but non-limiting example, the remapper
block 328 may apply an OR operation on the individual
destination grants (belonging to the respective super desti-
nation group) to generate a source-to-super destination
grant. The grant may be transmitted to the respective source
request queue 312, thereby popping the corresponding
packet (or request). In some embodiments, the grant may
trigger the packet to be removed from the respective source
request queue 312 and then be further processed (e.g.,
transmitted to the identified destination).

The DDS crossbar 300 may include a per-source ingress
data First-In-First-Out (FIFO) buffer (e.g., source request
queue(s) 312). The buffer may be virtually-output queued
with threading based on a destination. An incoming dynamic
destination routable packet may be pushed into the smallest
numbered thread belonging to a particular super destination
group. Similarly, when the pop happens for dynamic desti-
nation routable packet, the DDS crossbar 300 may read out
from the smallest numbered thread.

FIG. 4 illustrates an example of a process flow 400 in
accordance with aspects of the present disclosure. In some
examples, process flow 400 may be implemented by aspects
of a device 105, a crossbar circuit 205, a system 300, and/or
a DDS crossbar dispatcher 304 described with reference to
FIGS. 1 through 3.

In the following description of the process flow 400, the
operations may be performed in a different order than the
order shown, or the operations may be performed in different orders, at the same times, or at different times. Certain
operations may also be left out of the process flow 400, or
other operations may be added to the process flow 400.

Example aspects of the process flow 400 may be imple-
mented by a system including one or more crossbar circuits
that may route one or more packets within a communication
network.

The process 400 may begin when a packet is received
(step 404). The packet may be received at the device 105 or
at a component of the device 105 (e.g., the receiver 115, the
controller 120, a routing circuit 155, a crossbar circuit 205,
a DDS crossbar circuit 300, etc.). In some embodiments, the
packet may correspond to a packet on which a dispatching
decision needs to be made. In other words, the process flow
400 may be associated with dispatching a packet.

The process 400 continues by holding the packet in a
source request queue from the one or more source request
queues 312 (step 408). The source request queue(s) 312,
including the respective source request queue, may be
maintained on a super destination group basis.

The process 400 may further continue by invoking a
mapper 316 to map the super destination group to one or a
plurality of destination ports (step 412). In some embodi-
ments, the super destination group is mapped to multiple
destination ports.

The process 400 again continues by invoking an arbitra-
tion process to make a source-to-destination assignment for
the packet (step 416). In some embodiments, the source-to-
destination assignment for the packet may be made based on
destination credit and port availability at a time of receiving
the packet.

The process 400 may then continue by remapping the
plurality of destination ports back to the super destination
group (step 420). The process 400 may also include trig-
gering a release of the packet from the source request queue
312 (step 424) as well as causing the packet to be transmitted
to a selected destination port (step 428). The triggering of the
release of the packet may be performed simultaneous with
causing the packet to be transmitted to a selected destination
port.

As mentioned above, the routing decisions depicted and
described herein may be made on a per-cycle basis. Spe-
cifically, but without limitation, the routing circuit(s) 155
may be configured to redetermine destination credit and port
availability on a per cycle basis.

Any of the steps, functions, and operations discussed
herein can be performed continuously and automatically.

The exemplary apparatuses, systems, and methods of this
disclosure have been described in relation to examples of a
crossbar circuit. However, to avoid unnecessarily obscuring
the present disclosure, the preceding description omits a
number of known structures and devices. This omission is
not to be construed as a limitation of the scope of the claimed
disclosure. Specific details are set forth to provide an under-
standing of the present disclosure. It should, however, be
appreciated that the present disclosure may be practiced in
a variety of ways beyond the specific detail set forth herein.

It will be appreciated from the descriptions herein, and for
reasons of computational efficiency, that the components of
devices and systems described herein can be arranged at any
appropriate location within a distributed network of com-
ponents without impacting the operation of the device and/or
system.

Unless otherwise defined, all terms (including technical
and scientific terms) used herein have the same meaning as
commonly understood by one of ordinary skill in the art to
which this disclosure belongs. It will be further understood that terms, such as those defined in commonly used dictionaries, should be interpreted as having a meaning that is consistent with their meaning in the context of the relevant art and this disclosure.

While the flowcharts have been discussed and illustrated in relation to a particular sequence of events, it should be appreciated that changes, additions, and omissions to this sequence can occur without materially affecting the operation of the disclosed examples, configuration, and aspects.

The foregoing discussion of the disclosure has been presented for purposes of illustration and description. The foregoing is not intended to limit the disclosure to the form or forms disclosed herein. In the foregoing Detailed Description for example, various features of the disclosure are grouped together in one or more examples, configurations, or aspects for the purpose of streamlining the disclosure. The features of the examples, configurations, or aspects of the disclosure may be combined in alternate examples, configurations, or aspects other than those discussed above. This method of disclosure is not to be interpreted as reflecting an intention that the claimed disclosure requires more features than are expressly recited in each claim. Rather, as the following claims reflect, inventive aspects lie in less than all features of a single foregoing disclosed example, configuration, or aspect. Thus, the following claims are hereby incorporated into this Detailed Description, with each claim standing on its own as a separate preferred example of the disclosure.

Other variations are within spirit of present disclosure. Thus, while disclosed techniques are susceptible to various modifications and alternative constructions, certain illustrated examples thereof are shown in drawings and have been described above in detail. It should be understood, however, that there is no intention to limit disclosure to specific form or forms disclosed, but on contrary, intention is to cover all modifications, alternative constructions, and equivalents falling within spirit and scope of disclosure, as defined in appended claims.

Use of terms "a" and "an" and "the" and similar referents in context of describing disclosed examples (especially in context of following claims) are to be construed to cover both singular and plural, unless otherwise indicated herein or clearly contradicted by context, and not as a definition of a term. Terms "comprising," "having," "including," and "containing" are to be construed as open-ended terms (meaning "including, but not limited to,") unless otherwise noted. "Connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within range, unless otherwise indicated herein and each separate value is incorporated into specification as if it were individually recited herein. In at least one example, use of term "set" (e.g., "a set of items") or "subset" unless otherwise noted or contradicted by context, is to be construed as a nonempty collection comprising one or more members. Further, unless otherwise noted or contradicted by context, term "subset" of a corresponding set does not necessarily denote a proper subset of corresponding set, but subset and corresponding set may be equal.

Conjunctive language, such as phrases of form "at least one of A, B, and C," or "at least one of A, B and C," unless specifically stated otherwise or otherwise clearly contradicted by context, is otherwise understood with context as used in general to present that an item, term, etc., may be either A or B or C, or any nonempty subset of set of A and B and C. For instance, in illustrative example of a set having three members, conjunctive phrases "at least one of A, B, and C" and "at least one of A, B and C" refer to any of following sets: {A}, {B}, {C}, {A, B}, {A, C}, {B, C}, {A, B, C}. Thus, such conjunctive language is not generally intended to imply that certain examples require at least one of A, at least one of B and at least one of C each to be present. In addition, unless otherwise noted or contradicted by context, term "plurality" indicates a state of being plural (e.g., "a plurality of items" indicates multiple items). In at least one example, number of items in a plurality is at least two, but can be more when so indicated either explicitly or by context. Further, unless stated otherwise or otherwise clear from context, phrase "based on" means "based at least in part on" and not "based solely on."

Operations of processes described herein can be performed in any suitable order unless otherwise indicated herein or otherwise clearly contradicted by context. In at least one example, a process such as those processes described herein (or variations and/or combinations thereof) is performed under control of one or more computer systems configured with executable instructions and is implemented as code (e.g., executable instructions, one or more computer programs or one or more applications) executing collectively on one or more processors, by hardware or combinations thereof. In at least one example, code is stored on a computer-readable storage medium, for example, in form of a computer program comprising a plurality of instructions executable by one or more processors. In at least one example, a computer-readable storage medium is a non-transitory computer-readable storage medium that excludes transitory signals (e.g., a propagating transient electric or electromagnetic transmission) but includes non-transitory data storage circuitry (e.g., buffers, cache, and queues) within transceivers of transitory signals. In at least one example, code (e.g., executable code or source code) is stored on a set of one or more non-transitory computer-readable storage media having stored thereon executable instructions (or other memory to store executable instructions) that, when executed (i.e., as a result of being executed) by one or more processors of a computer system, cause computer system to perform operations described herein. In at least one example, set of non-transitory computer-readable storage media comprises multiple non-transitory computer-readable storage media and one or more of individual non-transitory storage media of multiple non-transitory computer-readable storage media lack all of code while multiple non-transitory computer-readable storage media collectively store all of code. In at least one example, executable instructions are executed such that different instructions are executed by different processors—for example, a non-transitory computer-readable storage medium store instructions and a main central processing unit ("CPU") executes some of instructions while a graphics processing unit ("GPU") executes other instructions. In at least one example, different components of a computer system have separate processors and different processors execute different subsets of instructions.

Accordingly, in at least one example, computer systems are configured to implement one or more services that singly or collectively perform operations of processes described herein and such computer systems are configured with applicable hardware and/or software that enable performance of operations. Further, a computer system that implements at least one example of present disclosure is a single device and, in another example, is a distributed computer system comprising multiple devices that operate differently such that distributed computer system performs operations described herein and such that a single device does not perform all operations.

Use of any and all examples, or exemplary language (e.g., "such as") provided herein, is intended merely to better illuminate examples of disclosure and does not pose a limitation on scope of disclosure unless otherwise claimed. No language in specification should be construed as indicating any non-claimed element as essential to practice of disclosure.

In description and claims, terms "coupled" and "connected," along with their derivatives, may be used. It should be understood that these terms may be not intended as synonyms for each other. Rather, in particular examples, "connected" or "coupled" may be used to indicate that two or more elements are in direct or indirect physical or electrical contact with each other. "Coupled" may also mean that two or more elements are not in direct contact with each other, but yet still co-operate or interact with each other.

Unless specifically stated otherwise, it may be appreciated that throughout specification terms such as "processing," "computing," "calculating," "determining," or like, refer to action and/or processes of a computer or computing system, or similar electronic computing device, that manipulate and/or transform data represented as physical, such as electronic, quantities within computing system's registers and/or memories into other data similarly represented as physical quantities within computing system's memories, registers or other such information storage, transmission or display devices.

In a similar manner, term "processor" may refer to any device or portion of a device that processes electronic data from registers and/or memory and transform that electronic data into other electronic data that may be stored in registers and/or memory. As non-limiting examples, "processor" may be a CPU or a GPU. A "computing platform" may comprise one or more processors. As used herein, "software" processes may include, for example, software and/or hardware entities that perform work over time, such as tasks, threads, and intelligent agents. Also, each process may refer to multiple processes, for carrying out instructions in sequence or in parallel, continuously or intermittently. In at least one example, terms "system" and "method" are used herein interchangeably insofar as system may embody one or more methods and methods may be considered a system.

In present document, references may be made to obtaining, acquiring, receiving, or inputting analog or digital data into a subsystem, computer system, or computer-implemented machine. In at least one example, process of obtaining, acquiring, receiving, or inputting analog and digital data can be accomplished in a variety of ways such as by receiving data as a parameter of a function call or a call to an application programming interface. In at least one example, processes of obtaining, acquiring, receiving, or inputting analog or digital data can be accomplished by transferring data via a serial or parallel interface. In at least one example, processes of obtaining, acquiring, receiving, or inputting analog or digital data can be accomplished by transferring data via a computer network from providing entity to acquiring entity. In at least one example, references may also be made to providing, outputting, transmitting, sending, or presenting analog or digital data. In various examples, processes of providing, outputting, transmitting, sending, or presenting analog or digital data can be accomplished by transferring data as an input or output parameter of a function call, a parameter of an application programming interface or interprocess communication mechanism.

Although descriptions herein set forth example implementations of described techniques, other architectures may be used to implement described functionality, and are intended to be within scope of this disclosure. Furthermore, although specific distributions of responsibilities may be defined above for purposes of description, various functions and responsibilities might be distributed and divided in different ways, depending on circumstances.

Furthermore, although subject matter has been described in language specific to structural features and/or methodological acts, it is to be understood that subject matter claimed in appended claims is not necessarily limited to specific features or acts described. Rather, specific features and acts are disclosed as exemplary forms of implementing the claims.

What is claimed is:

1. A Dynamic Destination Selection (DDS) crossbar, comprising:
   one or more adaptive routing circuits that are to track destination credit and port availability at a time of dispatching a packet, group multiple destinations into super destination groups, perform dynamic destination routing within a super destination group, and use the destination credit and port availability for the super destination group at the time of dispatching the packet to select an output destination for the packet, wherein the one or more adaptive routing circuits comprise one or more source request queues that are maintained on a super destination group basis;
   a mapper block, wherein the mapper block is connected to an output of a respective source request queue from the one or more source request queues, and wherein the mapper block maps a super destination group to multiple destination ports, based on the destination credit availability at the time of dispatching the packet; and
   one or more arbiter blocks to make source-to-destination assignments for the packet.

2. The DDS crossbar of claim 1, wherein the one or more arbiter blocks are connected to an output of the mapper block.

3. The DDS crossbar of claim 2, wherein the one or more arbiter blocks make the source-to-destination assignment for the packet based on the destination port availability at the time of dispatching the packet.

4. The DDS crossbar of claim 2, wherein the one or more adaptive routing circuits further comprise:
   a remapper block connected to an output of the one or more arbiter blocks, wherein the remapper block maps the multiple destination ports back to the super destination group.

5. The DDS crossbar of claim 4, wherein the remapper block triggers the packet to be removed from the respective source request queue upon processing the packet.

6. The DDS crossbar of claim 1, wherein the packet comprises a static destination routable packet, which can be routed to specific destination only.

7. The DDS crossbar of claim 1, wherein the packet comprises a dynamic destination routable packet, which can be routed to any one of the destinations in a super destination group.

8. The DDS crossbar of claim 1, further comprising a per-source ingress data buffer.

9. The DDS crossbar of claim 8, wherein the per-source ingress data buffer is virtually-output queued based on destination.

10. The DDS crossbar of claim 1, wherein the one or more adaptive routing circuits comprise a two-dimensional arbiter that supports routing of static destination routable packets and dynamic destination routable packets.

11. The DDS crossbar of claim 1, wherein the one or more adaptive routing circuits are to redetermine the destination credit and port availability on a per cycle basis.

12. A system for dispatching a packet, comprising:

one or more adaptive routing circuits that include:

one or more source request queues that are maintained on a super destination group basis and that are to receive the packet for dispatching;

a mapper block connected to an output of a respective source request queue from the one or more source request queues, wherein the mapper block maps a super destination group to multiple destination ports;

one or more arbiter blocks that make source-to-destination assignments for the packet; and a remapper block connected to an output of the one or more arbiter blocks, wherein the remapper block maps the multiple destination ports back to the super destination group.

13. The system of claim 12, wherein the mapper block is one of a plurality of mapper blocks and wherein each of the plurality of mapper blocks map different super destination groups to a respective subsets of destination ports.

14. The system of claim 13, wherein the remapper block is one of a plurality of remapper blocks and wherein each of the plurality of remapper blocks map the respective subset of destination ports back to the different super destination groups.

15. The system of claim 14, wherein the one or more arbiter blocks reside between the plurality of mapper blocks and the plurality of remapper blocks.

16. The system of claim 14, wherein a number of source request queues in the one or more source request queues map to different super destinations groups.

17. A switch, comprising:

a crossbar having one or more adaptive routing circuits that are to:

hold a packet in source request queue that is maintained on a super destination group basis;

map the super destination group to a plurality of destination ports;

make a source-to-destination assignment for the packet based on destination credit and port availability at a time of receiving the packet;

remap the plurality of destination ports back to the super destination group; and trigger release of the packet from the source request queue while also causing the packet to be transmitted to a selected destination port.

18. The switch of claim 17, wherein the one or more adaptive routing circuits are to redetermine the destination credit and port availability on a per cycle basis, and wherein the one or more adaptive routing circuits comprise a two-dimensional arbiter that supports routing of static destination routable packets and dynamic destination routable packets.

\* \* \* \* \*